Nov. 4, 1952            F. PARKS            2,616,487
ROTATABLY AND PIVOTALLY SUPPORTED FLUID
PRESSURE ACTUATED TIRE DEMOUNTER

Filed Nov. 30, 1950            2 SHEETS—SHEET 1

Inventor
Frank Parks

By *Clarence A. O'Brien and Harvey B. Jacobson*
Attorneys

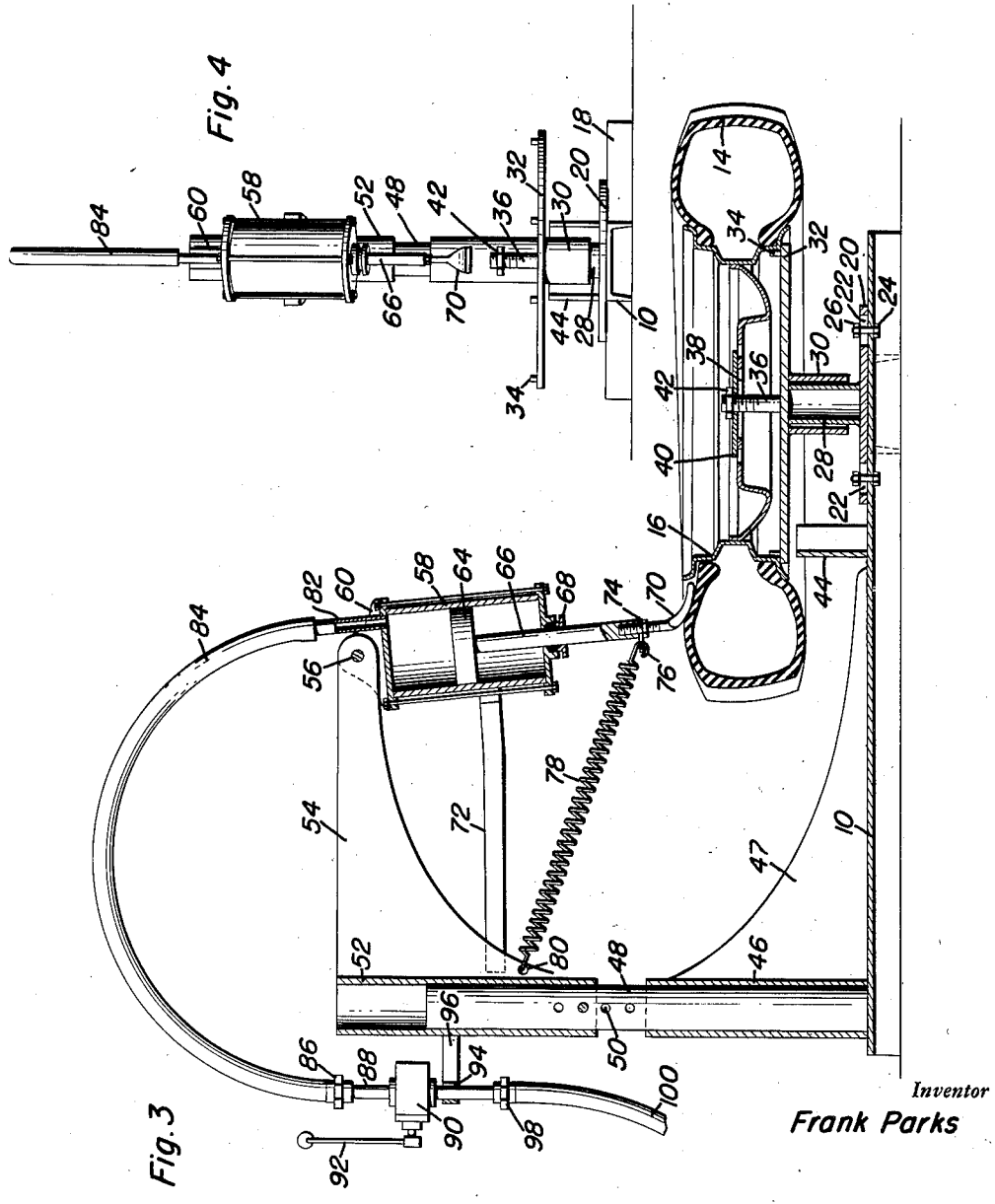

Patented Nov. 4, 1952

2,616,487

UNITED STATES PATENT OFFICE 2,616,487

ROTATABLY AND PIVOTALLY SUPPORTED FLUID PRESSURE ACTUATED TIRE DEMOUNTER

Frank Parks, Astoria, Oreg., assignor of forty-nine per cent to Robert P. Parks, Astoria, Oreg.

Application November 30, 1950, Serial No. 198,271

3 Claims. (Cl. 157—1.26)

This invention relates to a device for removing truck and bus tires from their rims.

The primary object of this invention is to provide an hydraulically operated tire demounting device which is relatively simple in design and construction, sturdy, very easy to operate, and very efficient for its intended purpose.

A further object of this invention is to provide a tire demounting apparatus comprising a base member, means for removably retaining a tire and rim upon one end of said base member, a standard rotatably secured upon the opposite end of said base member, means for locking said standard against rotation in adjusted position upon said base member, an hydraulic cylinder pivoted to the upper end of said standard, a piston and piston rod slidable in said cylinder, said rod including a foot adapted to engage the tire and loosen the bead from the rim, a valved conduit connected to said cylinder for admitting fluid under pressure into said cylinder and operating said foot, and resilient means urging said cylinder towards said standard.

These, together with various ancillary objects and features of the invention which will later become apparent as the following description proceeds, are attained by the device, a preferred embodiment of which has been illustrated, by way of example only, in the accompanying drawings, wherein:

Figure 3 is a vertical sectional view through the device and through a tire shown mounted thereon; and Figure 4 is an elevational view of the device looking to the left on Figure 1.

Specific reference will now be made to the drawings. In the several views, in the accompanying drawings and in the following specification, similar reference characters indicate corresponding elements throughout.

Figure 1:
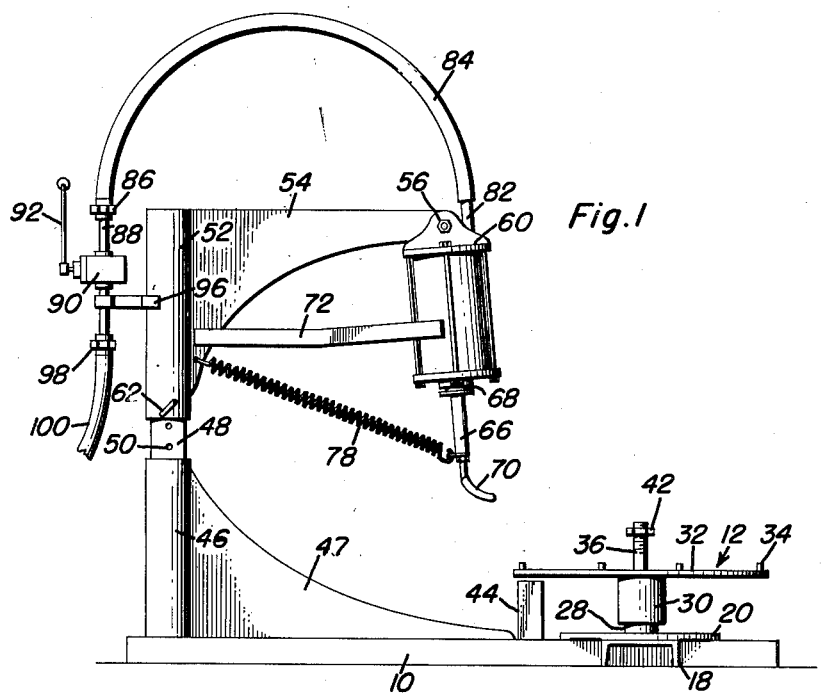
Figure 1 is a side elevational view of the device.
Figure 2:
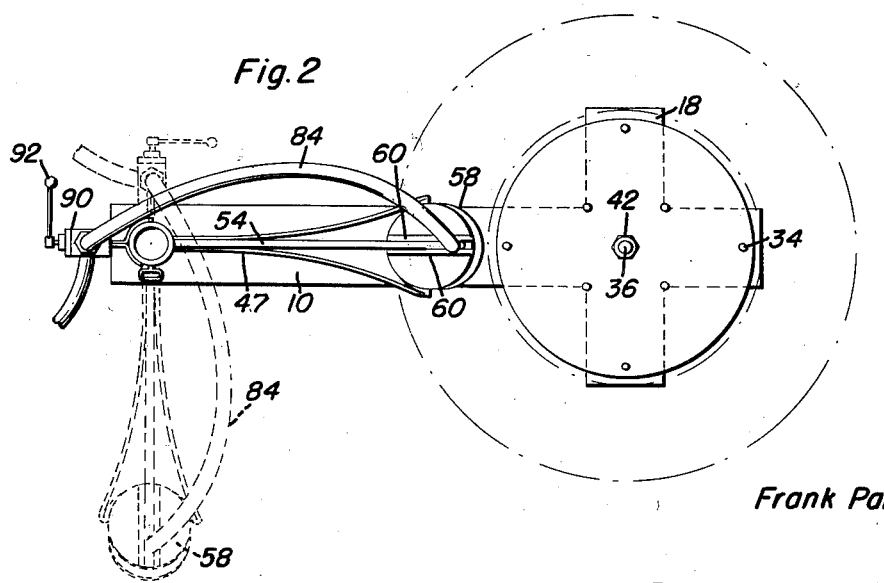
Figure 2 is a top plan view of the device.

The device may be fabricated of suitable metal and comprises an elongated base member 10 preferably of channel construction having a means 12 at one end thereof for removably mounting a tire 14 secured upon a rim 16.

The base member at the tire supporting means is further provided with a laterally extending channel-shaped member 18 to balance the base member and prevent tipping thereof during the demounting operation.

The means for removably supporting the tire and associated rim upon the base member comprises a plate 20 having elongated slots 22 adjacent its ends, the plate being secured to the base member by means of suitable headed bolts 24 and nuts 26. Intermediate its ends, the plate 20 has welded thereto an upstanding, preferably tubular shaft 28 upon which is rotatably journaled a collar 30 welded centrally to a circular plate 32, the latter being provided with spaced upstanding protuberances 34 and a centrally located upstanding externally threaded bolt 36. The bolt 36 is adapted to extend through the central aperture 38 in the rim 16 and the rim is securely retained in place on the plate 32 by means of a bar 40 which extends diametrically across the rim and is received centrally on the bolt 36 to be secured thereto by means of the internally threaded nut 42. As shown clearly in Figure 3, the upstanding protuberances 34 bear against the inner periphery of the rim to assist in supporting the tire and associated rim upon the plate 32. Thus, it will be seen that the tire and associated rim are rotatably mounted by means of the collar 30 journaled upon the shaft 28 on one end of the base member 10, the base member being provided with an upstanding stop 44 of arcuate construction to limit the downward tilting movement of the tire and rim at the position where the foot engages the tire in the demounting operation.

Welded to the base member 10 opposite the tire and rim mounting means is an upstanding tubular member 46, the tubular member being properly supported upon the base member by bracing webs 47. Secured in the tubular member 46 is a vertically extending shaft 48 provided with a plurality of vertically spaced diametrically extending bores or apertures 50 for a purpose soon to appear. Journaled upon the upper end of the shaft 48 is another tubular member 52 having a laterally extending arm 54, to the free end of which is pivoted, as at 56, the upper end of an hydraulic cylinder 58. The pivotal connection is obtained by providing a pair of vertically extending parallel ears 60 straddling the arm 54 and journaled upon the ends of the pivot pin 56. It will thus be seen that the arm supporting the hydraulic cylinder is rotatable through the integral tubular member 52 upon the shaft 48. The tubular member 52 is vertically adjustable upon the shaft 48 and can be retained against rotation upon the shaft by means of a pin 62 removably extending through a pair of diametrically aligned apertures in the bottom of the tube 52, the pin being selectively receivable in one of the vertically spaced apertures 50 in the shaft 48.

Slidable in the hydraulic cylinder 58 is a piston 64 retained upon a piston rod 66 which slidably extends through a sealing ring 68 in the bottom of the cylinder, the free end of the piston rod removably retaining an arcuate foot 70. Secured to the annular wall of the hydraulic cylinder 58 is a stop bar 72. Carried at the free end of the piston rod 66 is an apertured lug 74 removably engaging the hooked end 76 of a coil spring 78 which is removably attached at its other end, as at 80, to the arm 54 adjacent the tubular member 52. The spring is tensioned to normally urge the cylinder toward the shaft 48, the movement being limited by engagement of the stop bar 72 with the outer wall of the tubular member 52, as will be readily apparent from the drawings.

A pipe section 82 is secured to the top of the cylinder and is communicative with the interior thereof and removably received upon the pipe section is a fluid conveying conduit 84 which is coupled, as at 86, to a further pipe section 88 in which is connected a conventional valve 90 operated by a lever bar 92. The portion of the pipe section 88 below the valve 90 extends through an aperture 94 in a bar 96 carried by the tubular member 52, the pipe 88 being coupled, as at 98, to a conduit 100 connecting with a source of fluid under pressure, such as compressed air (not shown).

In practical operation, the tire 14 and rim 16 are assembled upon the plate 32 in a manner which will be readily understood, particularly with reference to Figure 3. When the valve 90 is actuated by the lever 92 so that fluid under pressure is admitted into the cylinder 58, the foot 70 will be forced downwardly against the tire 14 to loosen the bead from the rim 16. Upon again actuating the valve 90 by the lever 92 to release the pressure in the hydraulic cylinder 58, the spring 78 will pull the foot 70 upwardly and will also pivot the cylinder 58 towards the shaft 48, there to be limited in its movement by the stop bar 72. This operation takes the foot out of engagement with the tire and rim and thereafter the tire and rim can be revolved upon the shaft 28 to a new position, whereupon actuation of the valve 90 again to admit fluid under pressure into the cylinder 58 will lower the foot 70 in the manner previously described to loosen the tire from the rim at a new position. This operation is repeated around the periphery of the tire until the entire tire is loosened from the rim.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A tire demounting apparatus comprising a base member, means for removably retaining a tire and rim upon one end of said base member, a stop member mounted on said base member and disposed beneath said tire retaining means to limit tipping thereof, a standard secured upon the opposite end of said base member, an arm rotatably mounted on said standard, means for locking said arm against rotation in adjusted position upon said standard, an hydraulic cylinder pivoted to the end of said arm, a piston and piston rod slidable in said cylinder, said rod including a foot adapted to engage the tire and loosen the bead from the rim, a valved conduit connected to said cylinder for admitting fluid under pressure into said cylinder and operating said foot, and resilient means urging said cylinder towards said standard.

2. A tire demounting apparatus comprising a base member, means for removably retaining a tire and rim upon one end of said base member, a stop member mounted on said base member and disposed beneath said tire retaining means to limit tipping thereof, a standard secured upon the opposite end of said base member, an arm rotatably mounted on said standard, means for locking said arm against rotation in adjusted position upon said standard, a hydraulic cylinder pivoted to the end of said arm, a piston and piston rod slidable in said cylinder, said rod including a foot adapted to engage the tire and loosen the bead from the rim, a valved conduit connected to said cylinder for admitting fluid under pressure into said cylinder and operating said foot, and resilient means urging said cylinder towards said standard, said resilient means including a spring terminally secured to said standard and said piston rod and a stop bar carried by said cylinder and adapted to abut said standard.

3. The combination of claim 2 wherein said standard includes a vertical shaft secured upon the base member, a bracket upon which said cylinder is pivoted, said bracket including a tube rotatably receiving said vertical shaft, said locking means including vertically spaced apertures in said vertical shaft and a pin extending through said tube and receivable in a selected one of said shaft apertures.

FRANK PARKS.

REFERENCES CITED

The following references are of record in the file of this patent:

UNITED STATES PATENTS

| Number | Name | Date |
|---|---|---|
| 1,538,875 | Stevens | May 19, 1925 |
| 1,716,882 | Freivogel | June 11, 1929 |
| 1,824,246 | Van Daam | Sept. 22, 1931 |
| 2,538,962 | Branick | Jan. 23, 1951 |

FOREIGN PATENTS

| Number | Country | Date |
|---|---|---|
| 765,192 | France | Mar. 19, 1934 |